United States Patent
Kobayshi et al.

(10) Patent No.: US 8,528,934 B2
(45) Date of Patent: Sep. 10, 2013

(54) AIRBAG DEVICE

(75) Inventors: Hiroshi Kobayshi, Katano (JP); Keita Yamauchi, Suita (JP); Katsunori Imai, Itami (JP)

(73) Assignee: Ashimori Industry Co., Ltd., Osaka (JP)

( * ) Notice: Subject to any disclaimer, the term of this patent is extended or adjusted under 35 U.S.C. 154(b) by 117 days.

(21) Appl. No.: 13/201,356

(22) PCT Filed: Jan. 7, 2010

(86) PCT No.: PCT/JP2010/050099
§ 371 (c)(1),
(2), (4) Date: Aug. 12, 2011

(87) PCT Pub. No.: WO2010/092844
PCT Pub. Date: Aug. 19, 2010

(65) Prior Publication Data
US 2011/0298201 A1    Dec. 8, 2011

(30) Foreign Application Priority Data

Feb. 13, 2009 (JP) .................. 2009-031036

(51) Int. Cl.
*B60R 21/233* (2006.01)
*B60R 21/231* (2011.01)
*B60R 21/2346* (2011.01)
*B60R 21/207* (2006.01)

(52) U.S. Cl.
USPC ......... 280/740; 280/730.2; 280/742; 280/729

(58) Field of Classification Search
USPC .................. 280/730.2, 743.1, 729, 736, 740, 280/742
See application file for complete search history.

(56) References Cited

U.S. PATENT DOCUMENTS

| | | | |
|---|---|---|---|
| 6,270,113 B1 * | 8/2001 | Wipasuramonton et al. ................ | 280/730.2 |
| 7,661,699 B2 * | 2/2010 | Buhrlen et al. ............... | 280/729 |
| 7,837,226 B2 * | 11/2010 | Honda et al. ............... | 280/730.2 |
| 7,900,957 B2 * | 3/2011 | Honda .......................... | 280/729 |
| 7,926,838 B2 * | 4/2011 | Honda et al. .................. | 280/729 |

(Continued)

FOREIGN PATENT DOCUMENTS

| | | |
|---|---|---|
| EP | 1433667 A2 | 6/2004 |
| EP | 1 829 755 A1 | 9/2007 |

(Continued)

OTHER PUBLICATIONS

European Search Report corresponding to European Patent Application No. 10741124.1, dated Jun. 21, 2012.

*Primary Examiner* — Ruth Ilan
(74) *Attorney, Agent, or Firm* — Sughrue Mion, PLLC

(57) ABSTRACT

Closing movement of at least one of two or more air chambers is started at an early stage, and an inflated air chamber is tightly closed and maintained in an inflated state for a long time. Inside of an airbag is partitioned into air chambers, with a partitioning cloth, and a diffuser that stores a gas generator is disposed in the air chambers, through the partitioning cloth. Gas from a gas generator is rectified by the diffuser, and is supplied from outlet parts, into the air chambers, thereby inflating and deploying the air chambers. An occupant side base cloth, a semi-perimeter portion around the lower outlet part, is connected to a back-side base cloth of the airbag, and in accordance with an inflation of the lower air chamber, a tension is imposed on the occupant side base cloth from the back-side base cloth, thereby elongating the lower air chamber. This causes the base cloths to come close to each other and gradually narrow the opening width, thereby enabling the base cloths to closely stick to each other so as to close the opening of the lower outlet part.

12 Claims, 6 Drawing Sheets

(56) References Cited

U.S. PATENT DOCUMENTS

| | | |
|---|---|---|
| 2005/0189742 A1 | 9/2005 | Kumagai et al. |
| 2005/0248132 A1* | 11/2005 | Wheelwright ............... 280/729 |
| 2006/0001244 A1 | 1/2006 | Taguchi et al. |
| 2006/0175809 A1 | 8/2006 | Yamaji et al. |
| 2007/0126220 A1* | 6/2007 | Huber et al. .................. 280/740 |

FOREIGN PATENT DOCUMENTS

| | | |
|---|---|---|
| JP | 10-081187 A | 3/1998 |
| JP | 11-348709 A | 12/1999 |
| JP | 2000-108834 A | 4/2000 |
| JP | 2004-262261 A | 9/2004 |
| JP | 2004-268682 A | 9/2004 |
| JP | 2006-008015 A | 1/2006 |
| JP | 2006-008016 A | 1/2006 |
| JP | 2006-008017 A | 1/2006 |
| JP | 2006-008064 A | 1/2006 |
| WO | 2006/049101 A1 | 5/2006 |

* cited by examiner

FIG. 6A
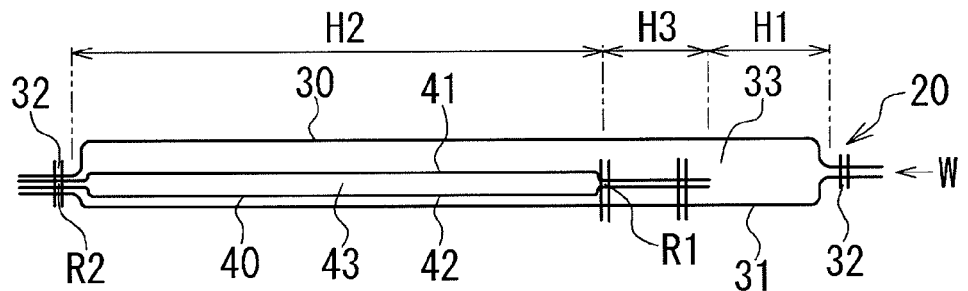
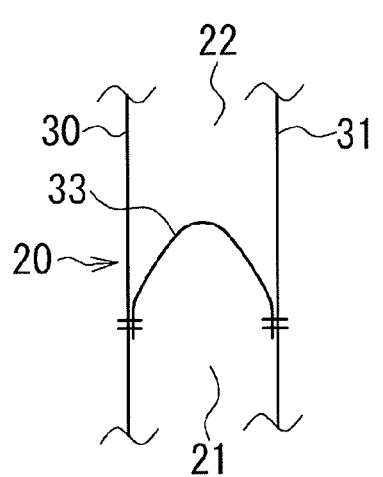
FIG. 6B
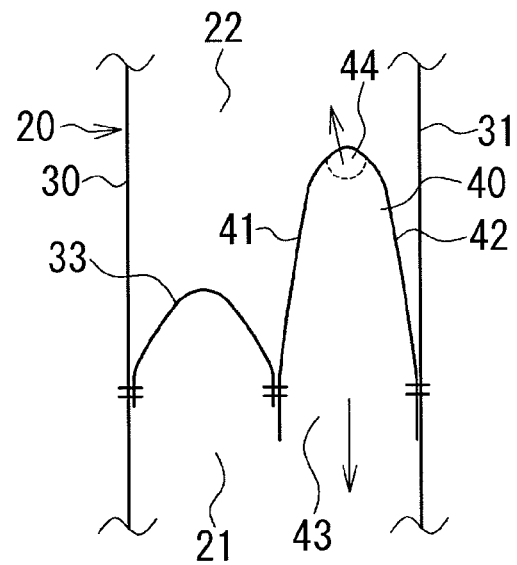
FIG. 6C
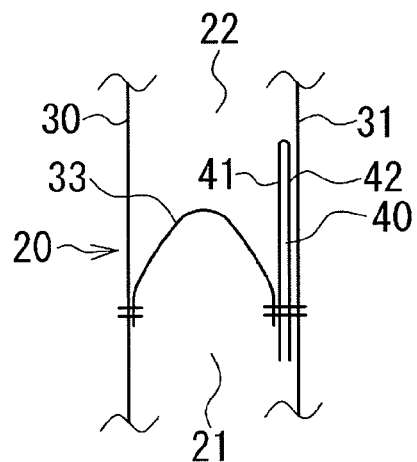
FIG. 6D

AIRBAG DEVICE

CROSS REFERENCE TO RELATED APPLICATIONS

This application is a National Stage of International Application No. PCT/JP2010/050099 filed on Jan. 7, 2010, which claims priority from Japanese Patent Application No. 2009-031036, filed on Feb. 13, 2009, the contents of all of which are incorporated herein by reference in their entirety.

TECHNICAL FIELD

The present invention relates to an airbag device that is mounted on a vehicle such as an automobile, in particular to an airbag device that has a diffuser for storing a gas generator in the expansible and deployable airbag partitioned into two or more air chambers, and rectifies gases generated through the diffuser and then supplies them to the respective air chambers.

BACKGROUND ART

In order to protect an occupant at the time of vehicle collision or emergency, there is widely used a side airbag device to protect the occupant from a side with air chambers formed in an airbag for mainly protecting the chest, the abdomen, and the lumbar of the occupant by inflating and deploying the airbag between the inner sidewall of a vehicle and the occupant. In such a side airbag device, it is necessary to keep an inner pressure (a gas pressure) high by quickly inflating and deploying an air chamber for a lumbar in the airbag particularly in order to inhibit an occupant from moving toward the collision side and secure a space for deploying the airbag, at the time of side collision.

Therefore, an airbag device of supplying a gas to lower and upper air chambers in an airbag through a gas distributor, making the size of the outlet port of the gas distributor for the lower chamber to supply the gas to the lower chamber for a lumbar larger than the size of the outlet port for the upper chamber, disposing a check valve to prevent the gas from flowing from the lower chamber to the upper chamber, inflating and deploying the lower chamber quickly, and keeping the pressure of the lower chamber high has heretofore been known (refer to Patent Literature 1).

With such a conventional airbag device, however, the outlet port of the gas distributor for the lower chamber is extended toward the side of the lower chamber, the check valve is formed with the extended part, and, when an occupant hits the lower chamber and a gas flows from the lower chamber to the upper chamber, the extended part comes close together in the manner of closing the lower chamber outlet port and the gas is prevented from flowing out. Therefore, with the airbag device, the lower chamber outlet port begins to close after the lower chamber inflates and then, the lumbar of the moving occupant is received by the lower chamber. As a result, undesirably, the start of the closing operation of the lower chamber outlet port and the sealing of the lower chamber by the closure may be delayed and the inner pressure of the lower chamber may lower by then. Furthermore, with the airbag device, the gas distributor is formed with a cloth wrapped in a cylindrical shape and, when the lower chamber inflates, the outer circumferential surface sticks to both the separating surfaces of the airbag and the lower chamber outlet port expands in the same way as the airbag. Consequently, the lower chamber outlet port, although how it closes is not obvious, starts to close gradually from a cylindrically expanded state after an occupant hits the lower chamber, hence it takes time until it is closed, and the sealing of the inflated lower chamber and the transfer to a state of being capable of maintaining the inner pressure may be delayed undesirably.

PRIOR TECHNICAL LITERATURE

Patent Literature
Patent Literature 1: Japanese Unexamined Patent Application No. 2004-268682

DISCLOSURE OF THE INVENTION

The present invention has been made in view of such conventional problems and an object thereof is to: start the closing movement of at least one of two or more air chambers partitioned in an airbag at an early stage; tightly close an inflated air chamber at an early stage; and keep the inflated state for a longer time through the use of a simple configuration of not increasing the number of parts in an airbag device.

The present invention is an airbag device having, in an inner space formed by joining opposing base cloths, an airbag partitioned into at least a first air chamber and a second air chamber, a gas generator for supplying a gas to the airbag and inflating and deploying the airbag, and a diffuser that stores the gas generator, is disposed through the first and second air chambers in the airbag, rectifies the gas generated by the gas generator, and supplies the gas to the first and second air chambers, wherein: the first and second air chambers are partitioned from each other so that the gas supplied through the diffuser may not directly flow; and the diffuser has a first outlet part and a second outlet part that opens on the first and second air chambers, respectively, to thereby let the gas out, at least one of the outlet parts is connected to one of the opposing clothes of the airbag, and the opening narrows gradually and closes by a tension imposed from the connected cloth in conjunction with the inflation of the airbag.

The present invention makes it possible to: start the closing movement of at least one of two or more air chambers partitioned in an airbag at an early stage; tightly close an inflated air chamber at an early stage; and keep the inflated state for a long time through the use of a simple configuration of not increasing the number of parts in an airbag device.

BRIEF DESCRIPTION OF THE DRAWINGS

FIG. 6 comprises cross-sectional views schematically showing the substantial part of a partitioning cloth according to the present embodiment in a state of being joined.

BEST MODES FOR CARRYING OUT THE INVENTION

An embodiment of an airbag device according to the present invention will be explained in reference to drawings.

An airbag device according to the present embodiment is a device for protecting an occupant or the like seated in an automobile, for example, through the use of an inflated airbag and the following explanations will be made on the basis of a side airbag device for protecting an occupant from a side by inflating and deploying an airbag from a seat between a vehicle inner sidewall and the occupant.

Figure 1:
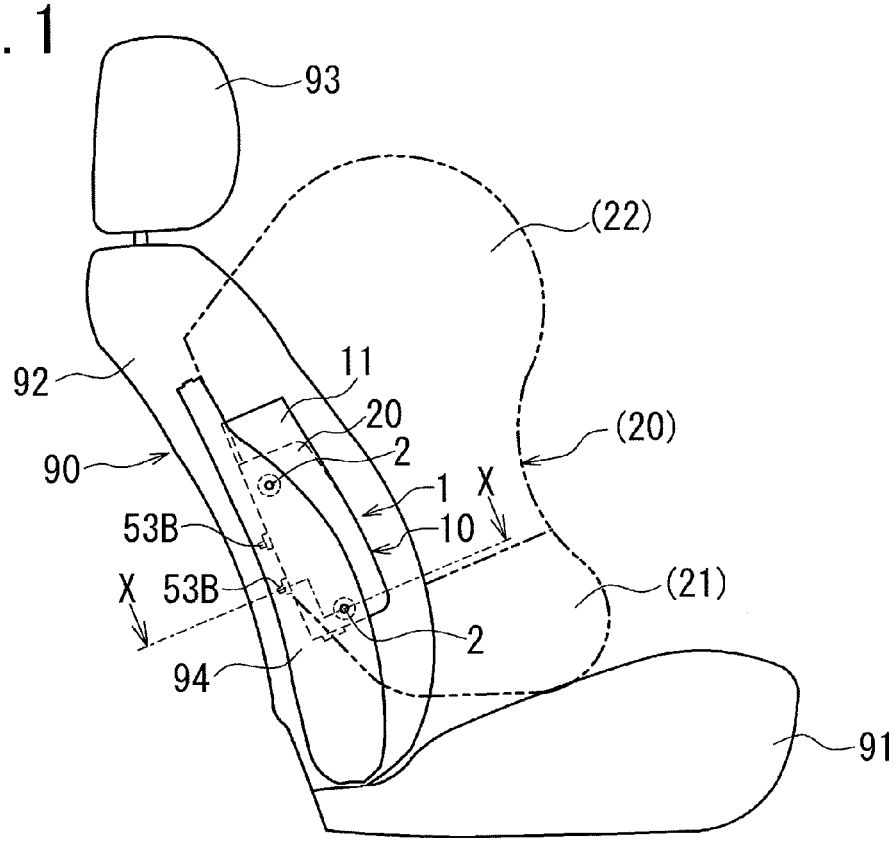
FIG. 1 is a side view schematically showing a substantial part of an airbag device according to the present embodiment in a state of being mounted on a vehicle.

FIG. 1: is a side view schematically showing a substantial part of an airbag device according to the present embodiment in a state of being mounted on a vehicle; and perspectively shows the inside of a seat 90 viewed from the vehicle lateral direction. Furthermore, in the figure, the back side of the sheet represents the side of a vehicle inner sidewall such as a door, the front side of the sheet represents the occupant side (vehicle inner side), the right-hand side represents the vehicle front side, and the left-hand side represents the vehicle rear side. Moreover, in the figure, an inflated and deployed airbag 20 in a vehicle is schematically shown with a chain double-dashed line.

As shown in the figure, the seat 90 is an ordinary seat for an automobile and comprises a seat cushion 91 on which an occupant sits, a seat back 92 on the occupant back side, and a headrest 93 for receiving the head of the occupant.

An airbag device 1 includes a case 10 for storing the whole unit; and, in a state of being stored in the case 10, is disposed in the seat back 92 and fixed to a seat frame 94 in the inside. From the state, in the event of vehicle emergency, impact detection, or the like, the airbag device 1 inflates the airbag 20, bursts out the airbag 20 from the inside to the outside of the seat back 92 in a vehicle, and inflates and deploys the airbag 20 toward the vehicle front direction between an occupant and a vehicle inner sidewall. Because of this, the airbag 20 is disposed on the side of the occupant while inflated and deployed in the range from the seat cushion 91 in front of the seat back 92 to the headrest 93 and the occupant side surface of the airbag 20 is brought into contact with the occupant. On this occasion, in the airbag device 1, respective air chambers 21 and 22 formed in the inside of the airbag 20 receive and protect the corresponding parts of the occupant. The configuration of the airbag device 1 will be hereunder explained in sequence.

Figure 2:
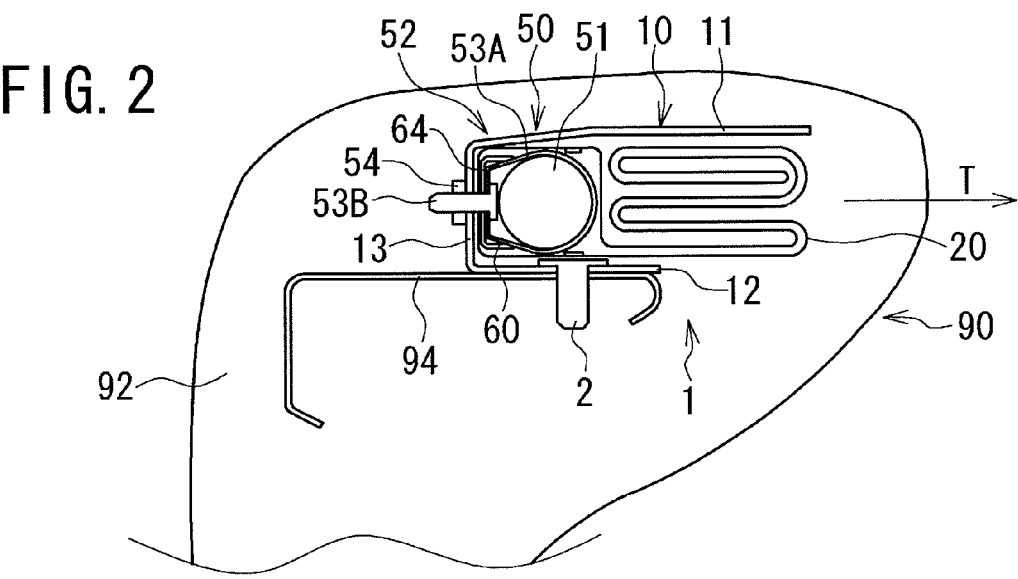
FIG. 2 is a cross-sectional view taken on line X-X of FIG. 1 schematically showing a substantial part of an airbag device before operation according to the present embodiment.

FIG. 2 is a cross-sectional view taken on line X-X of FIG. 1 schematically showing a substantial part of an airbag device 1 disposed in a seat back 92 before it is activated. As shown in the figure, the airbag device 1: has an expansible and deployable airbag 20 and a gas generator 50 for supplying a gas to the airbag 20 and inflating and deploying the airbag 20, both being stored in a case 10; and is disposed along the rim on the side of the vehicle inner sidewall (the upper side in the figure) in the seat back 92.

The case 10: comprises a pair of tabular sidewalls 11 and 12 facing each other and sandwiching the airbag 20 and the gas generator 50 and a bottom plate 13 connecting the edges thereof; and is formed integrally with resin, for example, so that the surface other than the sidewalls 11 and 12 and the bottom plate 13 opens. Furthermore, the case 10 is disposed so that the opening on the tip end side of the sidewalls 11 and 12 is directed toward the vehicle front side (the right-hand side in the figure) in the manner of opening the inside toward the direction and the sidewall 12 abuts onto the side surface of a seat frame 94 and is fixed with a plurality of (two in FIG. 1) penetrating bolts 2. The case 10: is a storage holder for storing and retaining the parts of the airbag device 1 comprising the airbag 20 and others and also a storage guide member for guiding the deployment of the stored airbag 20; and deploys the airbag 20 in a prescribed direction in proportion to inflation. Here, through the operation of the gas generator 50, the case 10 regulates the deployment direction of the airbag 20 with both the sidewalls 11 and 12, in particular, with the sidewall 11 protruding longer on the side of the vehicle inner sidewall, thereby enabling the airbag 20 to inflate and deploy toward the front direction in a vehicle (the arrow T in FIG. 2).

The gas generator 50: has an inflator 51 for generating a gas in the event of vehicle emergency, impact detection, or the like and a retention means 52 to retain the inflator 51; and is stored in the airbag 20 and attached to the case 10 after they are integrally assembled beforehand. Because of this, the gas generator 50 is fixed to the bottom part of the case 10, at the same time the base end of the airbag 20 is fixed to the case 10, and also at the time of inflation and deployment the base end of the airbag 20 is fixed to the case 10 and retained.

Figure 3:
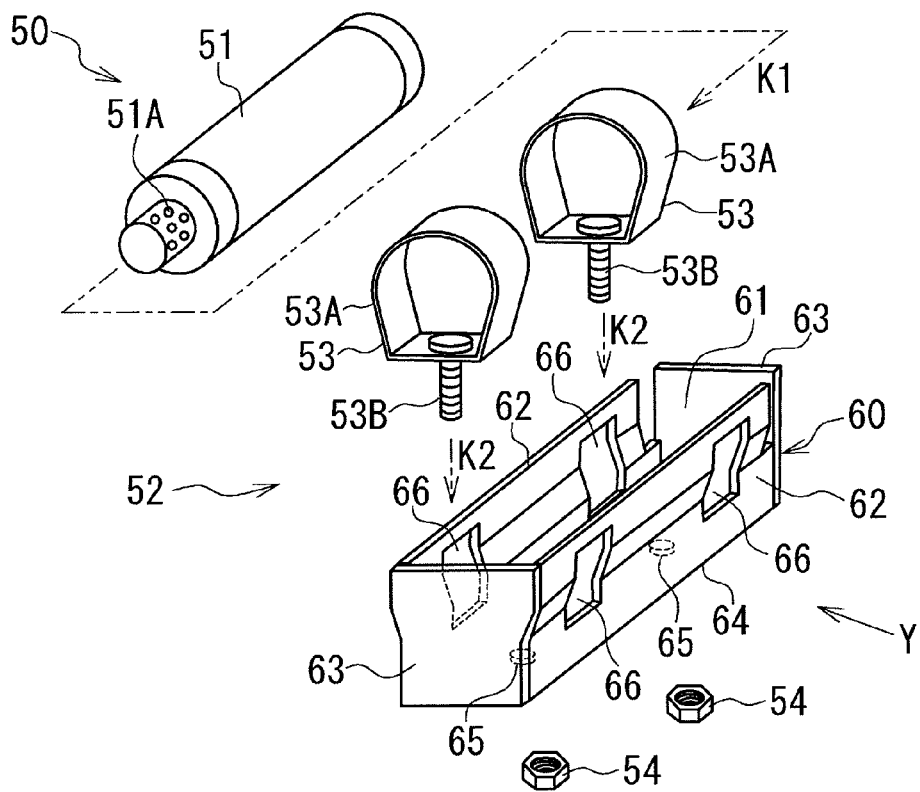
FIG. 3 is an exploded perspective view schematically showing a substantial part of a gas generator according to the present embodiment.

FIG. 3 is an exploded perspective view schematically showing a substantial part of a gas generator 50.

As shown in the figure, the gas generator 50: has a cylinder-type inflator 51 of a columnar shape (here, a circular columnar shape); and radially discharges a gas generated by the inflator 51 from an end thereof in the longitudinal direction (a plurality of gas exhaust ports 51A) and supplies the gas into an airbag 20. Furthermore, the gas generator 50 has at least one ring member 53 (here, two ring members), a casing holder 60, and nuts 54 to fix the ring members 53 to the casing holder 60 and others and a retention means 52 of the inflator 51 is configured with those parts.

Each of the ring members 53 comprises an elastically deformable annular part (clamp band) 53A of a circular shape, a horseshoe shape, or another shape and a bolt part 53B attached to the annular part 53A toward the outer direction, the inflator 51 is inserted into the annular parts 53A (the arrow K1 in the figure), and the annular parts 53A fits onto the outer circumferential surface thereof.

The casing holder 60 is a laterally long box-shaped storage member for storing the inflator 51 and the ring members 53, and in order to store them, an opening 61 is formed at one face (an upper face in the figure). Furthermore, the four side faces of the casing holder 60 comprise a pair of opposing long side plates 62 and a pair of opposing short side plates 63 and a prescribed number (here, two) of through-hole 65 which the bolt part 53B of the ring member 53 penetrate are formed in a bottom plate 64 at the bottom. Both the long side plates 62 of the casing holder 60: are elastically deformable toward the outside; and are formed so that the space between them on the side of the opening 61 is narrower than the width (outer diameter) of the annular parts 53A of the ring members 53. In addition, at the opposing positions in both the long side plates 62, two rectangular cut holes 66 into which the annular parts 53A of the ring members 53 may fit are formed in each of the long side plates 62 at the positions corresponding to the ring member 53.

When the ring members 53 and the inflator 51 are stored in the casing holder 60, the inflator 51 fitting into the annular parts 53A: is pushed into the inside from the opening 61 side (the arrow K2 in the figure); and is stored while the bolt parts 53B is inserted into the through-holes 65. On this occasion, in proportion to the pushing of the annular part 53A, at least either of the annular part 53A and the long side plates 62 elastically deform by pressure, the sides of the annular part 53A enter the inside of the corresponding cut hole 66, and the annular part 53A fits into the cut hole 66 by restoring the plastic deformation. At the same time, the bolt part 53B penetrates the through-hole 65 at the bottom and is disposed in the manner of protruding from the casing holder 60 toward the outside.

Figure 4:
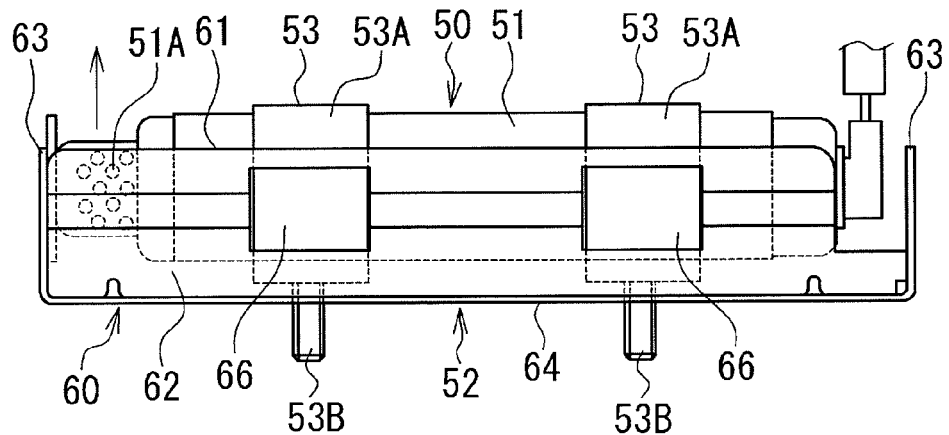
FIG. 4 is a side view of a gas generator according to the present embodiment viewed from the Y direction in FIG. 3.

FIG. 4 is a side view of a gas generator 50 that stores the inflator 51 into a casing holder 60 as described above and viewed from the Y direction in FIG. 3.

As shown in the figure, the ring member 53 is fixed by fitting the annular part 53A into the cut holes 66, then the inflator 51 stored in the casing holder 60 is temporarily attached through the ring member 53, and thus the respective members of the gas generator 50 are assembled.

After that, the gas generator 50 is stored into an aftermentioned diffuser disposed in the airbag 20 (refer to FIG. 2) and the bolt parts 53B protruding from the casing holder 60 is disposed by penetrating attachment holes formed in the diffuser and the airbag 20. Subsequently, the gas generator 50 is attached into the case 10 together with the airbag 20 by inserting the bolt parts 53B into the through-hole formed at a vehicle or fixed members, and other members (here, the bottom plate 13 of the case 10) and screwing and tightly fastening the nut 54 to the bolt part 53B. Because of this, the gas generator 50 is fixed into the inside of the case 10 and, at the same time, the inflator 51 is attracted strongly to the side of the bottom plate 64 by the annular part 53A of the ring member 53, abuts the casing holder 60, and is fixed firmly. Furthermore, the base end of the airbag 20 in which the gas generator 50 is stored is sandwiched between the bottom plate 64 of the casing holder 60 and the bottom plate 13 of the case 10 and fixed to the bottom in the case 10. The gas generator 50 and the airbag device 1 are fixed to a prescribed fixing position (here, the case 10) formed in a vehicle, a fixing member, and others with the bolt part 53b and the screw nut 54.

Here, the airbag device 1 may be fixed to a vehicle by directly attaching the bolt parts 53B protruding from the case 10 to an attachment piece formed on the seat frame 94 with the nut 54 without using the bolts 2 stated earlier to fix the case 10. On this occasion, it is possible to fix the airbag device 1 with the bolt part 53B of the gas generator 50 without using another fixing member and reduce the number of parts.

Furthermore, the airbag 20 before activated is: disposed mainly on the vehicle front side (on the side of the opening of the case 10) of the gas generator 50 fixed to the bottom in the case 10; and stored in the case 10 in the state of being folded so as to be expansible and deployable toward the inside of a vehicle. On this occasion, the airbag 20 is folded into a prescribed state and retained in a folded shape with the case 10, for example, by being wrapped toward the side of the vehicle inner sidewall and roll-folded, being bellows-folded in both the anteroposterior directions or the lateral directions of a vehicle in sequence, or being folded into the combination of the shapes.

Furthermore, in the present embodiment, the casing holder 60: has the function of rectifying a gas generated by the inflator 51 in the inside in a prescribed direction toward the inside of the airbag 20 (here, a diffuser that will be stated later); and mainly rectifies the gas from the opening 61 toward the vehicle front side where the folded airbag 20 is located. The airbag 20 inflates and deploys gradually from the folded state with the gas thus rectified and supplied continuously from the inflator 51 and deploys on the side of an occupant (refer to FIG. 1) toward the front in a vehicle (the arrow T in FIG. 2) as described above.

Figure 5:
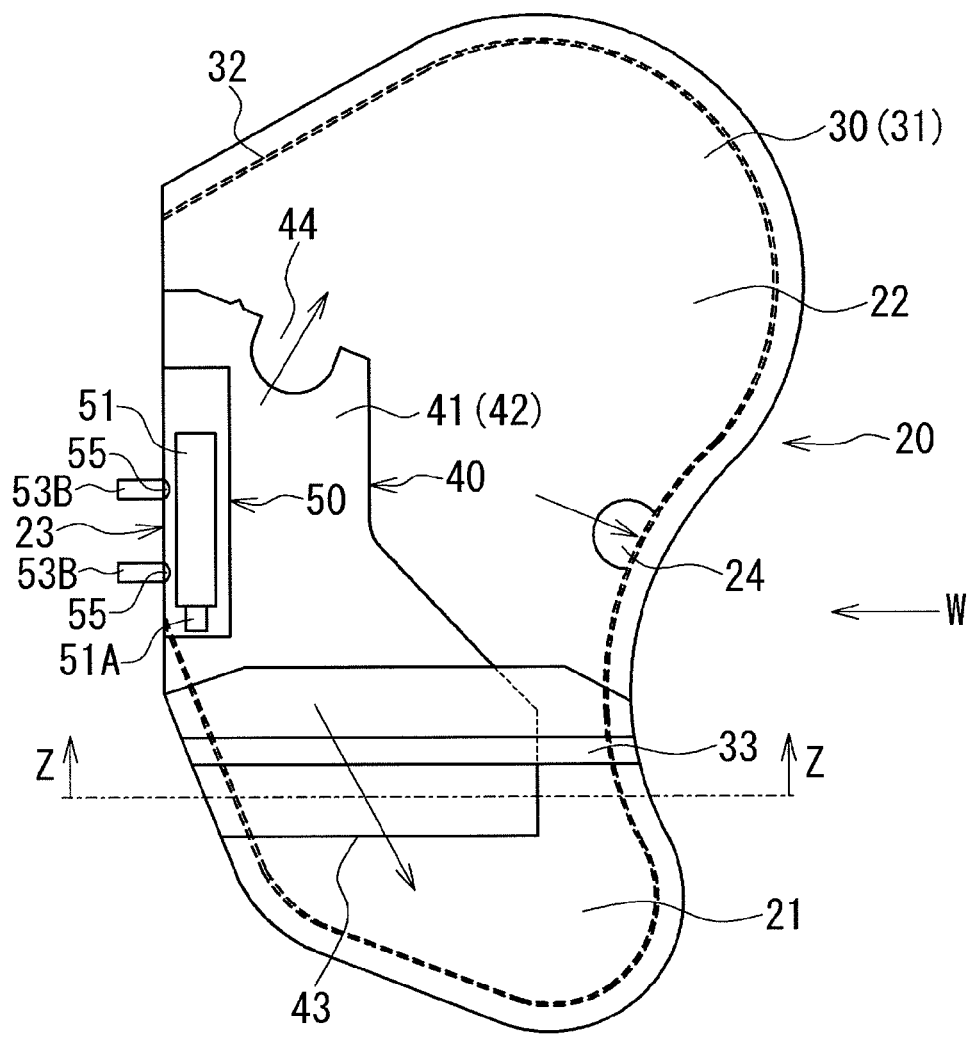
FIG. 5 is a development plan view schematically showing an airbag according to the present embodiment.

FIG. 5 is a development plan view schematically showing a deployed airbag 20 and also shows the inner structure by perspectively viewing the inside of the airbag 20 from the occupant side.

As shown in the figure, the airbag 20, in accordance with the deployment range on the side of an occupant, is formed into a bag-like shape so that the dimension in the vehicle vertical direction is larger than the dimension in the vehicle anteroposterior direction (the lateral direction in the figure) and the upper part is larger than the lower part toward the vehicle front side (the right-hand side in the figure). The airbag 20 is formed, for example, by: overlapping two sheets of base cloth having an identical shape on each other or folding back a sheet of base cloth having a symmetrical shape on itself, those base cloths being formed by cutting a fabric, a sheet, or the like; air-tightly joining opposing base cloths at an outer periphery or a prescribed position, for example, by sewing or bonding the base cloths along the rim of the outer periphery; and in the meantime partitioning expansible air chambers.

Here, the airbag 20 is constituted from a front-side base cloth (a first base cloth) 30 on the occupant side and a backside base cloth (a second base cloth) 31 on the vehicle inner sidewall side, those base cloths being connected to each other at a base end 23, and the opposing base cloths 30 and 31 are folded back at the base end 23, lapped on each other, and joined at an outer peripheral joint 32. The outer peripheral joint 32 is a joint formed along the outer periphery to separate the inside and the outside of the airbag 20 from each other and is formed by sewing the base cloths 30 and 31 together in a line or plural lines. Furthermore, the airbag 20 has a partitioning cloth 33 as a partitioning means and a diffuser 40 for storing the gas generator 50 in the inside and an inner space formed by joining the opposing base cloths 30 and 31 is partitioned into at least two (here, two) expansible air chambers (first and second air chambers) 21 and 22 with the partitioning cloth 33.

The partitioning cloth 33 comprises a base cloth formed into a band shape and is disposed at a prescribed position in the airbag 20 so that the longitudinal direction is parallel with the vehicle anteroposterior direction and both the edges in the width direction are joined to the opposing base cloths 30 and 31 of the airbag 20 and the diffuser 40 by sewing or the like. Because of this, the partitioning cloth 33 divides the airbag 20 into the upper and lower parts and partitions the airbag 20 into a lower air chamber 21 that is a first air chamber formed on the lower side and an upper air chamber 22 that is a second air chamber formed on the upper side, and the air chambers are inflated independently from each other. The lower air chamber 21 is an air chamber for a lumbar mainly for receiving and protecting the lumbar of a sitting occupant and is formed so as to be comparatively laterally long along the bottom of the airbag 20 and smaller than the upper air chamber 22 in response to the position of the lumbar of the occupant. In contrast, the upper air chamber 22 is an air chamber mainly for receiving and protecting the abdomen and the chest of a sitting occupant and is formed so as to be comparatively vertically long upward from the partitioning cloth 33 in response to the range from the abdomen to the chest of the occupant.

Furthermore, the partitioning cloth 33: functions also as a tether belt that inhibits the airbag 20 from inflating in the vehicle width direction and regulates and stabilizes the deployment shape; and is formed into the width and the shape in response to the thickness and the shape of the airbag 20 to be inflated and deployed, and both the edges in the width direction are joined, respectively. On this occasion, the partitioning cloth 33: includes a part that overlaps with the diffuser 40 and a part that does not overlap with the diffuser 40 and is located between both the base cloths 30 and 31 of the airbag 20; and is jointed differently at positions.

FIG. 6 comprises cross-sectional views schematically showing the substantial part of a partitioning cloth 33 in the state of joining; FIG. 6A is a cross-sectional view taken on line Z-Z of FIG. 5 and FIGS. 6B, 6C, and 6D are cross-sectional views showing the joining states in the respective areas H1, H2, and H3 shown in FIG. 6A viewed from the W direction in FIGS. 5 and 6A.

In the partitioning cloth 33, as shown in FIG. 6A, the joining states (each of the joints is shown with a double line) are different among a front area H1 located between both the base cloths 30 and 31 on the vehicle front side, a rear area H2 located between the front-side base cloth 30 and the diffuser 40 on the vehicle rear side, and an intermediate area H3 located between the front-side base cloth 30 and the diffuser 40 in between. In the front area H1, as shown in FIG. 6B, both the edges of the partitioning cloth 33 in the width direction (the lateral direction in the figure) are joined to both the base cloths 30 and 31 of the airbag 20, respectively. In the rear area H2, as shown in FIG. 6C, both the edges of the partitioning cloth 33 in the width direction are joined to the front-side base cloth 30 and one surface, facing the front-side base cloth 30, of the diffuser 40 (the occupant side base cloth 41), respectively. In the intermediate area H3, as shown in FIG. 6D, both the edges of the partitioning cloth 33 in the width direction are joined to the front-side base cloth 30, the diffuser 40, and the back-side base cloth 31 and both the surfaces of the diffuser 40 and the back-side base cloth 31 are also joined to each other.

In the rear area H2 (refer to FIG. 6C), the other surface of the diffuser 40 (the vehicle side base cloth 42 on the side of the vehicle inner sidewall) is joined to the back-side base cloth 31 along the partitioning cloth 33 and the whole diffuser 40 is joined annularly to the partitioning cloth 33 and the back-side base cloth 31. Consequently, in the diffuser 40 of the rear area H2, the base cloths 41 and 42 are not joined to each other, an opening toward the lower air chamber 21 is formed between the cloths, and the inside communicates with the lower air chamber 21 through an opening part (a lower outlet part 43) surrounding the opening. Furthermore, the mutually joined partitioning cloth 33 and diffuser 40 are joined over the whole circumference of both the opposing base cloths 30 and 31, and thus the airbag 20 is partitioned into the lower air chamber 21 and the upper air chamber 22 with the partitioning cloth 33 together with the diffuser 40 so that the gases in the respective insides can not directly flow. Because of this, both the air chambers 21 and 22 are partitioned while the partitioning cloth 33 is sandwiched so that the gases can not directly flow and the direct flow of the gases is inhibited between the air chambers 21 and 22.

The diffuser 40 (refer to FIG. 5): is a flexible (or deformable) gas rectifying member of a cylindrical shape; is arranged within the upper and lower air chambers 21 and 22 in the airbag 20; rectifies a gas generated by the gas generator 50 in the inside; and supplies the gas to both the air chambers 21 and 22. Here, the diffuser 40 is disposed from the base end 23 in the upper air chamber 22 to the inside of the lower air chamber 21 through the partitioning cloth 33 between the partitioning cloth 33 and the back-side base cloth 31 along the vehicle vertical direction while increasing the area gradually toward the lower air chamber 21. Furthermore, the diffuser 40 stores the whole gas generator 50 in the base end 23 in the upper air chamber 22 in a state where the gas exhaust port 51A of the inflator 51 is located on the lower air chamber 21 side.

At the location, the two bolt parts 53B of the gas generator 50 is disposed in the manner of penetrating the two attachment holes 55 penetrating the diffuser 40 and the airbag 20; and protruding outside the airbag 20.

In addition, the diffuser 40: has a lower outlet part 43 as a first outlet part that opens on the lower air chamber 21 and an upper outlet part 44 as a second outlet part that opens on the upper air chamber 22; and feeds a gas from the openings (vents) of the outlet parts 43 and 44 (refer to FIG. 6C) to the lower air chamber 21 and the upper air chamber 22, respectively. However, the diffuser 40 is formed so that at least either of the outlet parts 43 and 44 is connected to any one of the opposing base cloths 30 and 31 of the airbag 20 and, as will be described later, the opening is elongated gradually, narrowed in width, and closed at a prescribed stage by tension imposed from the connected base cloth in accordance with the inflation of the airbag 20.

In the present embodiment, the outlet part to be closed of the diffuser 40 is the lower outlet part 43 opening to the lower air chamber 21 and a semi-perimeter portion around an opening thereof (refer to FIG. 6) is integrally connected to one of the base cloths (here, the back-side base cloth 31) of the airbag 20. Furthermore, the diffuser 40 is formed by joining the overlapping base cloths 41 and 42 at a prescribed position, for example, by sewing the base cloths 41 and 42 along the outer edge, and one of the base cloths 41, 42 constituting the closed lower outlet part 43 is joined to the base cloths 30, 31 on the opposing side of the airbag 20. On this occasion, at the lower outlet part 43 in the airbag 20, the vehicle side base cloth 42 of the diffuser 40 is sewed to the back-side base cloth 31 of the airbag 20 and both the base cloths 42 and 31 are tightly stuck and attached to each other. It should be noted that at the lower outlet part 43 of the diffuser 40, the back-side base cloth 31 is also joined together to the joint of the overlapping base cloths 41 and 42 at both the ends R1 and R2 (refer to FIG. 6A) in the range connected to the back-side base cloth 31 and the three base cloths 41, 42, and 31 are integrally connected to each other. In this way, at least both the ends R1 and R2 of the semi-perimeter portion around the opening of the lower outlet part 43 of the diffuser 40 is integrally connected to the back-side base cloth 31.

Furthermore, in the diffuser 40, the lower outlet part 43 is constituted by an unjoined part between both the base cloths 41 and 42; and is formed at a lower end of the diffuser 40 located in the lower air chamber 21 along the upper edge of the lower air chamber 21. In contrast, the upper outlet part 44 comprises a through-hole formed in the diffuser 40 and is formed in the manner of opening upward in the upper air chamber 22 at the top end of the diffuser 40 located in the upper air chamber 22, and the opening is maintained without being closed even when the airbag 20 inflates. Furthermore, the diffuser 40: is formed so that the lower outlet part 43 to be closed opens larger than upper outlet part 44 not to be closed; at the early stage of gas generation, relatively increases outflow of a gas from the lower outlet part 43; and supplies more gas to the lower air chamber 21 than to the upper air chamber 22 through the outlet parts 43 and 44. In this way, when the gases supplied from the outlet parts 43 and 44 flow into both the air chambers 21 and 22, respectively, since both the air chambers 21 and 22 are partitioned so that the gases supplied through the diffuser 40 cannot directly flow as described above, both the air chambers 21 and 22 gradually inflate and deploy independently toward respective prescribed shapes.

In addition to the above, the airbag 20 has a vent hole (a gas exhaust port) 24 communicating with the upper air chamber 22 on the side of not-closed upper outlet part 44 (refer to FIG. 5), thereby enabling the gas in the upper air chamber 22 to be exhausted to the outside of the airbag 20. When the airbag 20 receives the chest to abdomen of an occupant with the upper air chamber 22, the airbag 20: exhausts the gas in the upper air chamber 22 through the vent hole 24; receives the body parts of the occupant gently; absorbs and alleviates the impact imposed on the occupant; and protects the occupant. Furthermore, the vent hole 24 is disposed at a position not facing the upper outlet part 44 and formed at a position in a vehicle lower than the upper outlet part 44 in the upper air chamber 22 and at the vehicle front side periphery of the back-side base 31 in a penetrating manner. By doing so, the gas in the upper air chamber 22 is exhausted from the vent hole 24 mainly toward the vehicle front on the side of the vehicle inner sidewall, the exhausted gas is prevented from directly hitting an occupant, and the vent hole 24 is prevented from being blocked by the vehicle inner sidewall.

The airbag 20 thus configured is folded and, together with the gas generator 50, stored in the case 10 (refer to FIG. 2) and attached in the seat back 92. After that, the airbag device 1: activates the gas generator 50 (the inflator 51) and generates a gas at the time of vehicle collision or in an emergency; rectifies the gas with the casing holder 60 as described above; and supplies the gas in the diffuser 40. By the gas, the diffuser 40 inflates up to the outlet parts 43 and 44 while the overlapping base cloths 41 and 42 separate from each other and the outlet parts 43 and 44 open to the air chambers 21 and 22, respectively. Furthermore, the gas is rectified toward the outlet parts 43 and 44 by the use of the diffuser 40, the gas flows from the inside of the diffuser 40 through the outlet parts 43 and 44 toward the directions of respective openings, and the gas is supplied to the respective air chambers 21 and 22. The respective air chambers 21 and 22 are inflated gradually by the gas supplied thereto, and thus the airbag 20 deploys frontward in a vehicle by the guide of the case 10 while the folded state is released, and inflates and deploys to the side of an occupant (refer to FIG. 1).

FIGS. 7A to 7E are cross-sectional views taken on line Z-Z of FIG. 5 schematically showing successively an airbag 20 that inflates and deploys. Furthermore FIGS. 8A and 8B are cross-sectional views schematically showing a substantial part of an airbag 20 viewed from the W direction in FIG. 5 at respective stages of inflation and deployment.

Figure 7A:
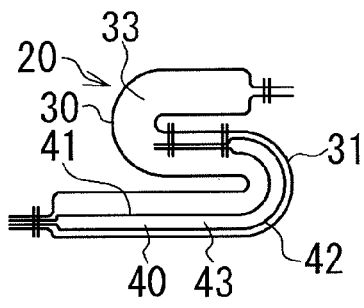
FIG. 7 represents cross-sectional views taken on line Z-Z of FIG. 5 schematically showing an inflating and deploying airbag in sequence.
Figure 7B:
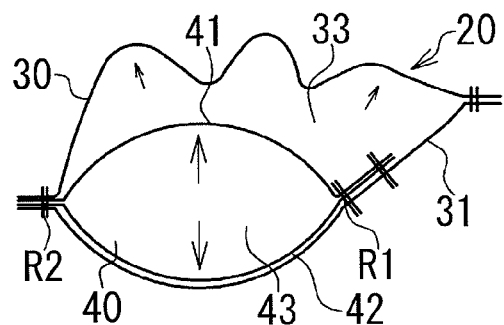
Figure 7C:
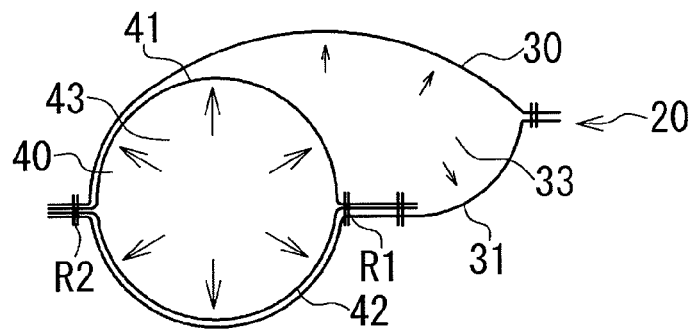
Figure 7D:
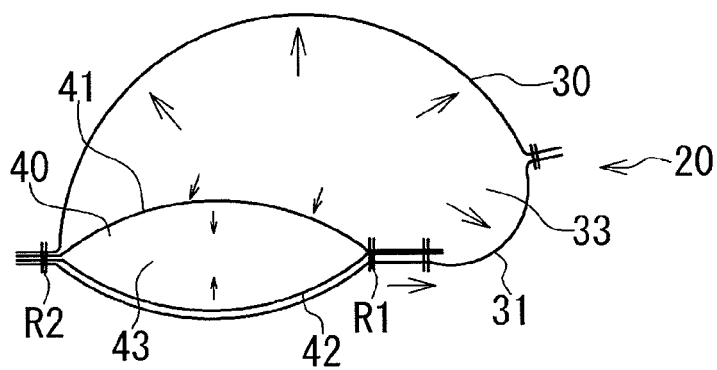
Figure 7E:
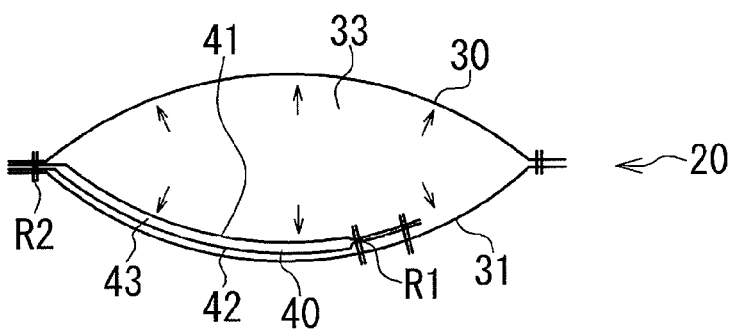
Figure 8A:
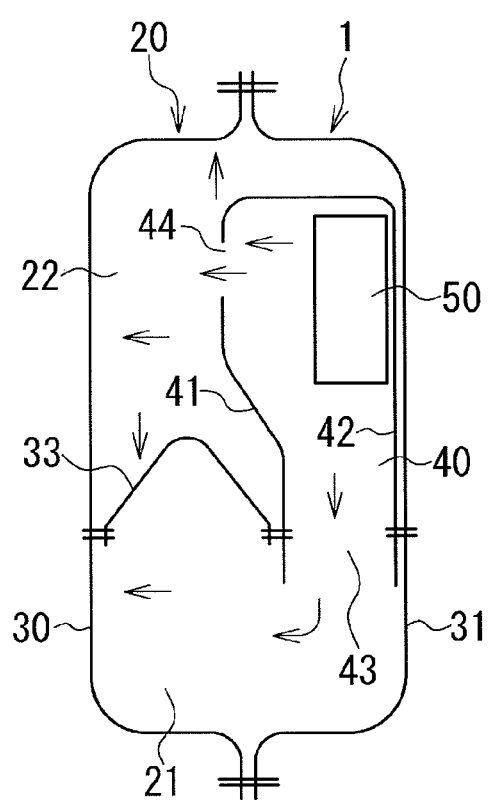
FIG. 8 represents cross-sectional views schematically showing a substantial part of an airbag viewed from the W direction in FIG. 5 at respective stages of inflation and deployment.
Figure 8B:
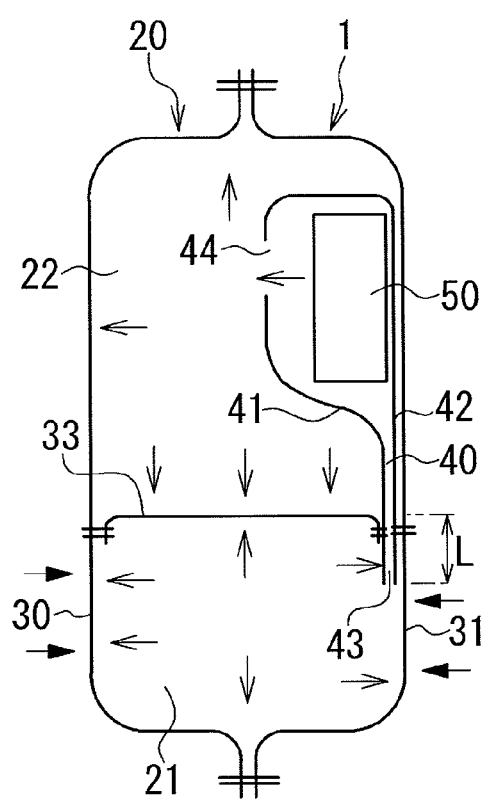

The airbag 20: is folded in a state of being overlapped with the diffuser 40 thereinside before inflation and deployment (refer to FIG. 7A); and, from the state, starts to inflate in conjunction with the supply of a gas and deploys and extends toward the vehicle front (to the right direction in the figure) (refer to FIG. 7B). At the early stage of the deployment, the airbag device 1 (refer to FIG. 8A): supplies the gas generated by the gas generator 50 from the diffuser 40 to the respective air chambers 21 and 22 through the respective openings of the outlet parts 43 and 44; starts to inflate the air chambers; and causes the base cloths 30 and 31 of the airbag 20 to be apart from each other.

On this occasion, at the lower outlet part 43, in the state where the base cloths 30 and 31 and the partitioning cloth 33 are loose or weak in tension during the inflation of the lower air chamber 21, tension is not imposed (or tension is low) on both the base cloths 41 and 42 surrounding the opening through a connecting part with them (here, the aforementioned annular joint). Consequently, the lower outlet part 43: comes to be in the state of inflating and opening by the pressure of the flowing gas; opens largely into a circular shape by the gas pressure (refer to FIGS. 7B and 7C); and feeds the gas toward the wide range of the lower air chamber 21. The airbag 20: inflates the air chambers 21 and 22 independently by the gas from the outlet parts 43 and 44 of the diffuser 40 while sandwiching the partitioning cloth 33 in between; here, lets much gas out from the lower outlet part 43 that opens larger; and inflates the lower air chamber 21 more rapidly than the upper air chamber 22. However, in the lower outlet part 43, the lower air chamber 21 inflates and the base cloths 30 and 31 gradually develop, expand, and stretch and, in accordance with the increase of the expansion, the opening gradually narrows and is closed by the tension imposed from the back-side base cloth 31 connected to the vehicle side base cloth 42.

Specifically, the tension received by the back-side base cloth 31 (refer to FIG. 7D) increases gradually as the lower air chamber 21 inflates toward a set shape by the increase of the inner pressure. In the lower outlet part 43, one semi-perimeter portion around the opening (the vehicle side base cloth 42) connected to the back-side base cloth 31 is pulled by the tension imposed from the back-side base cloth 31, and both the ends R1 and R2 of the joint are separated from each other and elongated integrally with the back-side base cloth 31. At the same time, the other semi-perimeter portion (the occupant side base cloth 41) of the lower outlet part 43 is: pulled similarly by the separation of both the edges R1 and R2 of the joint; pulled to the side of the vehicle side base cloth 42; and pushed toward the side of the vehicle side base cloth 42 by the gas flowing in the lower air chamber 21. In this way, the lower outlet part 43 is elongated and narrows gradually while the base cloths 41 and 42 on both the sides sandwiching the opening come close to each other, the base cloths 41 and 42 closely stick to each other (refer to FIGS. 7E and 8B) in response to the completion of the inflation and deployment of the lower air chamber 21, and the whole opening is closed. Furthermore, in the lower outlet part 43 after being closed, the occupant side base cloth 41 is pushed to the vehicle side base cloth 42 by the inner pressure of the lower air chamber 21 and maintained in a closely stuck (closed) state, and the sticking part functions as a check valve. Because of this, the diffuser 40 seals the lower air chamber 21, prevents the gas from flowing out, and keep the lower air chamber 21 in a state of being inflated at a high pressure.

The airbag 20, after the opening of the lower outlet part 43 is closed (refer to FIG. 8B), supplies the gas from the diffuser 40 mainly to the upper air chamber 22, and inflates and deploys between an occupant and the vehicle inner sidewall throughout the area. Then, the airbag 20, when the occupant contacts with the front-side base cloth 30 of the inflated air chambers 21 and 22, receives the lumbar with the lower air chamber 21 and the chest to the abdomen with the upper air chamber 22, and constrains and protects the occupant in response to the body parts of the occupant.

On this occasion, in the airbag device 1 according to the present embodiment, the opening of the lower outlet part 43 of the diffuser 40 narrows gradually and is closed by the tension acting from the connected back-side base cloth 31 in accordance with the inflation of the airbag 20 as described above. Consequently, it is possible to: start the closing movement of the lower outlet part 43 at an early stage; and close the opening together with the completion of the inflation and deployment of the lower air chamber 21. For example, in comparison with the case of closing the opening after the inflation and deployment of the lower air chamber 21 is completed, it is possible to tightly close the lower air chamber 21 at an early stage and keep the inner pressure high. As a result, it is possible to: firmly constrain and protect the lumbar of an occupant at an early stage with the lower air chamber 21; inhibit the occupant from moving toward the side of the collision surface at the time of side collision; and secure a space for the deployment of the airbag 20 without fail. Furthermore, the occupant side base cloth 41 of the diffuser 40 is pushed toward the side of the vehicle side base cloth 42 by a gas when the gas flows into the lower air chamber 21 and as a result, closing movement of the lower outlet part 43 is assisted and thus starting of the movement and closing of the opening are achieved at an early stage. Meanwhile, after the lower air chamber 21 inflates and deploys and the opening of the lower outlet part 43 is closed, the occupant side base cloth 41 is pushed to the vehicle side base cloth 42 by the inner pressure of the lower air chamber 21 and thus it is possible to: firmly stick the base cloths 41 and 42 to each other; close the opening securely; and keep the inflated state of the lower air chamber 21 long. In addition, the opening and closing movements of the lower outlet part 43 are carried out only with the diffuser 40 without the use of another member and thus it is also possible to simplify the configuration of the airbag device 1 without the increase of the number of parts.

According to the present embodiment therefore, with a simple configuration of not increasing the number of parts in the airbag device 1, it is possible to: start the closing movement of at least one of two or more air chambers partitioned in the airbag 20 (here, the air chamber 21 out of the two air chambers 21 and 22) at an early stage; tightly close the inflated lower air chamber 21 at an early stage; and keep the inflated state for a long time. Furthermore, in the airbag device 1, since the semi-perimeter portion of the lower outlet part 43 of the diffuser 40 is constituted integrally with the back-side base cloth 31 of the airbag 20, it is possible to stick the opposing semi-perimeter portions of the lower outlet part 43 to each other without clearance and close the opening without fail. Moreover, since the lower outlet part 43 of the diffuser 40 is formed so as to be larger than the upper outlet part 44, it is possible to: supply the gas generated by the gas generator 50 more to the lower air chamber 21 than to the upper air chamber 22; inflate and deploy the lower air chamber 21 rapidly; and tightly close the lower air chamber 21 at an early stage. Meanwhile, when an occupant is received, since the inner pressure of the lower air chamber 21 increases and the force to stick the base cloths 41 and 42 of the lower outlet part 43 to each other increases or the deploying partitioning cloth 33 pushes the occupant side base cloth 41 to the vehicle side base cloth 42, the base cloths 41 and 42 closely stick to each other securely and the opening of the lower outlet part 43 is kept in a closed state.

Additionally, since the diffuser 40 can be formed and manufactured easily only by joining the overlapping base cloths 41 and 42 and the vehicle side base cloth 42 constitutes the semi-perimeter portion of the lower outlet part 43, the joint and the setting of the joint length to the back-side cloth 31 are facilitated. In addition, in the lower outlet part 43, since the base cloths 41 and 42 come close and closely stick to each other from a state where the overlapping base cloths 41 and 42 separate from each other and the opening is formed, the moving distance of the base cloths 41 and 42 until they closely stick to each other reduces and the opening can be closed at an early stage. Furthermore, since the gas generated by the inflator 51 (refer to FIG. 2) is rectified by the casing holder 60 in the diffuser 40, it is possible to smoothly feed the gas in an appropriate direction in the diffuser 40. Moreover, since the airbag 20 stored in the case 10 is deployed by the guide of the case 10, the airbag 20 deploys toward a prescribed direction securely and stably and inflates and deploys into a prescribed deployment shape at an early stage.

In the airbag 20 here, it is also possible to: partition the inside by another partitioning means, for example, by joining the front-side base cloth 30 to the back-side base cloth 31 or the diffuser 40, without forming a partitioning cloth 33 in the inside; and partition the airbag 20 into the air chambers 21 and 22 in the same way as the above case. However, when the air chambers 21 and 22 are partitioned with the partitioning cloth 33, the airbag 20 does not inflate and deploy in the manner of being constricted at the boundary of the air chambers 21 and 22, and it is possible to receive an occupant with the whole surface in the vertical direction of the airbag 20 that has entirely inflated and deployed. At the same time, with the partitioning cloth 33, in the same way as a tether belt, the deployment shape of the airbag 20 can be stabilized and the deploying partitioning cloth 33 (refer to FIG. 8B) pushes the occupant side base cloth 41 of the diffuser 40 toward the vehicle side base cloth 42, and thus it is possible to: close the opening of the lower outlet part 43 more quickly and firmly; and keep the lower air chamber 21 in a state of inflation and deployment.

Furthermore, with the airbag 20, by exhausting a gas from the vent hole 24 (refer to FIG. 5), it is possible to: softly receive the chest to abdomen of an occupant with the upper air chamber 22; and absorb and alleviate the impact imposed on the occupant. At the same time, through the upper outlet part 44 opening in the upper air chamber 22, it is possible to: reduce the inner pressure of the diffuser 40 to a level lower than the inner pressure of the lower air chamber 21; and increase the difference between the inner pressures. As a result, by the high inner pressure of the lower air chamber 21, it is possible to: stably keep the opening of the lower outlet part 43 in a closing state; and keep the lower air chamber 21 in an inflating state for a longer period of time.

Moreover, although the length of the diffuser 40 in the lower air chamber 21 (the length L in FIG. 8B) is relatively shortened and the lower outlet part 43 is formed on the side of the partitioning cloth 33 in the present embodiment, it is also possible to form the diffuser 40 so that the length thereof may be longer than the length L. That is, it is also possible to: form the diffuser 40 so as to protrude by a prescribed length from the boundary of both the air chambers 21 and 22 (here, the partitioning cloth 33) along the back-side base cloth 31 of the airbag 20 in the lower air chamber 21 on the side where the lower outlet part 43 opens; and form the lower outlet part 43 at the tip end. In this way, if the diffuser 40 is cylindrically protruded and the lower outlet part 43 is located in the vicinity of the bottom of the lower air chamber 21, for example, the gas flowing in the lower air chamber 21 ascends from the bottom of the lower air chamber 21 along the front-side base cloth 30. Then, the gas: is directed to the diffuser 40 along the partitioning cloth 33; flows in the manner of hitting the protruding occupant side base cloth 41 of the diffuser 40; and circulates in the lower air chamber 21. As a result, the flow rectifying function of rectifying the gas in the lower air chamber 21 is exhibited and it is possible to: prevent the gas from flowing backward from the lower outlet part 43 toward the inside of the diffuser 40; and keep the opening in a closing state more securely. In addition, since the area of the diffuser 40 on which the inner pressure of the lower air chamber 21 is imposed increases, it is possible to closely stick the base cloths 41 and 42 of the lower outlet part 43 and close the opening in a securer and firmer manner. On this occasion, from the viewpoint of securely securing the rectifying function and the closing effect of the lower outlet part 43, it is desirable to dispose the diffuser 40 so as to protrude up to the vicinity of the outer peripheral joint 32 (here, the vicinity of the outer periphery on the lower side of the airbag 20) of the opposing base cloths 30 and 31 of the airbag 20.

It should be noted that it is also possible to configure the diffuser 40 with both the base cloths 41 and 31, for example, by eliminating the vehicle side base cloth 42 (refer to FIG. 7)

and joining the edge of the occupant side base cloth 41 to the back-side cloth 31 of the airbag 20. On this occasion, a lower outlet part 43 similar to the above one is formed by joining the occupant side base cloth 41 and the back-side base cloth 31 in the manner of storing the gas generator 50, rectifying a gas, and opening a part thereof to the lower air chamber 21. That is, in the lower outlet part 43, an opening is formed between the occupant side base cloth 41 and the back-side base cloth 31 connected to each other, the semi-perimeter portion is constituted integrally with the back-side base cloth 31 of the airbag 20 (here, the back-side base cloth 31 corresponds to the semi-perimeter portion), the base cloths 41 and 31 stick to each other, and thus the opening is closed. In this way, the outlet part of the diffuser 40 may be a port that forms an opening with another member. Consequently, the outlet part of the diffuser 40 according to the present invention means an outlet part formed at least with a part of the diffuser 40 and includes an outlet part formed with the diffuser 40 and another member in addition to an outlet part formed only with the diffuser 40.

Furthermore, although the above explanations have been done on the basis of an airbag 20 having two upper and lower air chambers 21 and 22, it is also possible to: form two or more air chambers in the vertical direction, a lateral direction, or an oblique direction in the airbag 20; and constitute the outlet part of an air chamber to be closed similarly to the lower outlet part 43. Likewise, the upper air chamber 22 may be partitioned into two or more small air chambers and on this occasion it is desirable to form a vent hole 24 in any one of the small air chambers and communicate with the upper air chamber 22.

DESCRIPTION OF THE REFERENCE SYMBOLS

1: airbag device, 2: bolt, 10: case, 11, 12: sidewall, 13: bottom plate, 20: airbag, 21: lower air chamber, 22: upper air chamber, 23: base end, 24: vent hole, 30: front-side base cloth, 31: back-side base cloth, 32: outer peripheral joint, 33: partitioning cloth, 40: diffuser, 41: base cloth, 42: base cloth, 43: lower outlet part, 44: upper outlet part, 50: gas generator, 51: inflator, 51A: gas exhaust port, 52: retention means, 53: ring member, 53A: annular part, 53B: bolt part, 54: nut, 55: attachment hole, 60: casing holder, 61: opening, 62: long side plate, 63: short side plate, 64: bottom plate, 65: through-hole, 66: cut hole, 90: seat, 91: seat cushion, 92: seat back, 93: headrest, 94: seat frame

What is claimed is:

1. An airbag device comprising:
   an airbag formed by joining opposing base cloths, the airbag being partitioned into at least a first air chamber and a second air chamber;
   a gas generator for supplying a gas to the airbag which inflates and deploys the airbag; and
   a diffuser that stores the gas generator, is disposed through the first and second air chambers in the airbag, rectifies the gas generated by the gas generator, and supplies the gas to the first and second air chambers, wherein:
   the first and second air chambers are partitioned from each other so that the gas supplied through the diffuser cannot directly flow between the first and second air chambers; and
   the diffuser has a first outlet part and a second outlet part that open into the first and second air chambers, respectively, to thereby let the gas out, one of the first and second outlet parts is connected to one of the opposing base cloths of the airbag, and an opening of the one of the first and second outlet parts narrows gradually and closes by a tension imposed from the connected base cloth due to inflation of the airbag.

2. The airbag device according to claim 1, wherein:
   a portion of the diffuser at a perimeter of the one of the first and second outlet parts to be closed is connected with one of the base cloths of the airbag or is formed from one of the base cloths of the airbag.

3. The airbag device according to claim 1, wherein:
   the diffuser is formed by joining overlaid base cloths; and
   one of the base cloths constituting the one of the first and second outlet parts to be closed is joined to one of the base cloths of the airbag.

4. The airbag device according to claim 1, wherein:
   the diffuser is disposed along one of the base cloths of the airbag in the air chamber on the one of the first and second outlet parts to be closed in a manner of protruding from a boundary of the first and second air chambers to a vicinity of a joint connecting the opposing base cloths of the airbag; and
   the one of the first and second outlet parts to be closed is provided at a tip end of the diffuser.

5. The airbag device according to claim 1, further comprising:
   a partitioning cloth that is joined to the opposing base cloths of the airbag and the diffuser,
   wherein the partitioning cloth partitions the first and second air chambers so that the gas cannot directly flow between the first and second air chambers.

6. The airbag device according to claim 1, wherein:
   one of the first and second outlet parts of the diffuser is connected to one of the base cloths of the airbag and is closed; and
   the airbag has a vent hole to communicate with one of the first and second air chambers on a side of the diffuser which comprises another of the first and second outlet parts which is not closed.

7. The airbag device according to claim 1, wherein:
   one of the first and second outlet parts of the diffuser is connected to one of the base clothes of the airbag and is closed; and
   the one of the first and second outlet parts which is closed is formed so as to be larger than another of the first and second outlet part which is not closed.

8. The airbag device according to claim 1, wherein:
   the first and second air chambers are a lower air chamber and an upper air chamber provided on a lower side and an upper side of the airbag, respectively; and
   the first outlet part of the diffuser opening to the first air chamber is connected to one of the base cloths of the airbag and is closed.

9. The airbag device according to claim 1, wherein:
   the gas generator has an inflator to generate the gas, at least one ring member comprising an annular part into which the inflator fits and a bolt part attached outward to the annular part, and a casing holder to store the inflator fitting into the annular part from an opening side in a manner of penetrating the bolt part through a through-hole at a bottom of the casing holder and rectify the gas generated by the inflator; and
   the bolt part protrudes from the casing holder, is disposed in a manner of penetrating the diffuser and the airbag, and is fixed with a nut screwing together with the bolt part.

10. The airbag device according to claim 1, further comprising a storage guide member for storing the airbag and the gas generator and for guiding the deployment of the airbag.

11. The airbag device according to claim 1, wherein:
the one of the first and second outlet parts comprises two ends positioned opposite from each other,
the two ends are connected to respective portions of the opposing base cloth in the first air chamber, and
as the gas fills the first air chamber, the gas expands a volume of the first air chamber, thereby moving the two portions of the opposing base cloth apart from each other to create the tension which moves the two ends apart from each other and closes the opening.

12. The airbag device according to claim 11, wherein:
the other of the first and second outlet parts comprises two ends which open up into the second air chamber and are not connected to the opposing base cloths, such that after the opening of the one of the first and second outlet parts is closed by the tension, the gas flows exclusively through the other of the first and second outlet parts into the second air chamber.

* * * * *